United States Patent [19]
Sokat et al.

[11] Patent Number: 5,903,238
[45] Date of Patent: May 11, 1999

[54] RADIO STATION FOR MOBILE COMMUNICATION SYSTEMS AND METHOD FOR THE SELECTION OF A TRANSMISSION MEANS

[75] Inventors: Joerg Sokat, Munich; Michael Faerber, Wolfratshausen; Dieter Emmer, Germering; Kolio Ivanov; Peter Weber, both of Munich, all of Germany

[73] Assignee: Siemens Aktiengesellschaft, Munich, Germany

[21] Appl. No.: 08/935,152

[22] Filed: Sep. 22, 1997

[30] Foreign Application Priority Data

Sep. 20, 1996 [EP] European Pat. Off. .............. 96115166

[51] Int. Cl.⁶ ..................................................... H01Q 21/06
[52] U.S. Cl. ........................... 342/365; 342/361; 455/562
[58] Field of Search ................................... 342/361, 365; 455/562, 272

[56] References Cited

U.S. PATENT DOCUMENTS 5,267,268 11/1993 Källander .................................. 375/40
5,691,727 11/1997 Cyzs ........................................ 342/361
5,724,666 3/1998 Dent ........................................ 455/526

FOREIGN PATENT DOCUMENTS 195 17 140 4/1996 Germany .

Primary Examiner—Mark Hellner
Attorney, Agent, or Firm—Hill & Simpson

[57] ABSTRACT

In a radio station for mobile communication systems, the reception branches of at least two antenna units having different polarization are monitored in order to acquire statements about the polarization direction of the incident wave. Corresponding to the polarization direction of the incident wave, an adaptive fashioning of the radiation characteristic ensues, this fashioning the polarization direction of the emitted wave according to the weighting of the reception signals of the reception branches for the same communication connection. The connection from a base station to a mobile station in a mobile communication system therefore can be improved with an inventive radio station.

14 Claims, 5 Drawing Sheets

RADIO STATION FOR MOBILE COMMUNICATION SYSTEMS AND METHOD FOR THE SELECTION OF A TRANSMISSION MEANS

BACKGROUND OF THE INVENTION

1. Field of the Invention

The present invention is directed to a radio station for mobile radio telephone systems and to a method for the selection of a transmission means in a radio station for mobile communication systems.

2. Description of the Prior Art

Mobile communication systems enable the setup of communication connections to and from mobile subscribers wherein information is transmitted via a radio interface. Various methods for separating the subscribers can be utilized at the radio interface. Such methods include, for example, time-division multiplex, frequency-division multiplex or code-division multiplex methods. A known mobile communication system, for example, is the GSM (Global System for Mobile Communication) mobile radio telephone system.

In mobile radio telephony, the information on the radio interface is transmitted with electromagnetic waves. The waves then become polarized as a result of the geometry and the arrangement of the transmission antenna used to emit the waves. After the transmission of the mobile radio telephone channel which characterizes the radio interface, only a part of the energy of the polarized wave is absorbed by the reception antenna. The received energy is maximized when the polarization of the received wave coincides with the polarization of the reception antenna.

The polarization of the emitted wave is modified due to defractions and reflections in the mobile radio telephone channel. In addition, the angle of inclination of the reception antenna has a critical influence on its polarization. In the case of a mobile subscriber using a hand-held unit, this angle is not predictable and is thus purely random. As a result of these factors, the polarization of the wave and the polarization of the reception antenna generally will not coincide and the mobile receiver usually will be able to absorb only a part of the maximally available energy of the electromagnetic wave.

German Patent Application 196 17 140 7 discloses a polarization diversity that may be utilized for improving the reception in a reception station wherein two or more antennas with different polarization supply a reception station with signals that are at least partially decorrelated. Thereafter, the reception station can make a selection from the reception signals. What is not considered in this reception station scenario, however, is that comparable problems also occur for the communication connection from a base station to a mobile station. Indeed, a polarization diversity is difficult to implement in the mobile station due to the constricted construction possibilities.

SUMMARY OF THE INVENTION

The object of the present invention is to specify a radio station and a method with which the communication between a base station and a mobile station can be improved in a mobile communication system. This object is achieved in a radio station for mobile communication systems having at least two antenna units with different polarization which are respectively connected to a duplexer for the separation of transmission and reception branches, a channel separation unit connected to each duplexer, a channel aggregation unit connected to each duplexer and a control unit for the transmission-branch-related control of transmission signals onto one or more antenna units. This object is further achieved in a method for selecting a transmission means in a radio station as herein described. By evaluating the reception signals of a plurality of antenna units of different polarization, it is possible for the radio station to estimate the polarization of the incident wave. Using the estimated values, the control unit can then control the transmission signals onto one or more antenna units such that the polarization direction of each emitted wave largely coincides with that of the incident wave for the same communication connection. Since the antenna units in all radio stations of a mobile communication system are typically used for both transmission and reception, the emitted wave of each transmission signal is set to the preferred reception direction of the receiving radio station.

The radio station is preferably a base station in a mobile radio telephone network whose radiation characteristic can be adaptively set to the privileged polarization direction of the mobile station with reference to the polarization. The transmitting radio station can thus polarize the emitted wave such that it is coplanarly adjacent to the reception antenna at the receiver. Further, the radio station can adaptively regulate the polarization of the emitted wave according to the time change of the polarization due to movement on the part of the mobile station.

In the process of allocating a subscriber to a desired polarization, it is fundamentally possible to design either the connection between an antenna unit and a reception unit or the connection between a reception unit and the signal processing link to be switchable for the corresponding subscriber. In the former instance, the allocation of a transmission unit to the antenna takes place. Conversely, in the second instance, the transmission unit is permanently connected to the antenna unit and the allocation takes place from the subscriber to the transmission unit.

The polarization direction of the emitted wave can be advantageously fashioned when the transmission signals of two antenna units are cross-polarized relative to one another. Simplified calculation bases can be derived and arbitrary polarization directions may be set. It is expedient to select linear or oppositely circular polarizations for the individual antenna units.

According to an alternative embodiment of the radio station, a means for level measurement for the at least two reception signals received by the antenna units is provided as well as a means for determining the polarization direction of the reception signals from the level measurement. The control unit is fashioned such that the transmission signals for the at least two transmission branches are weighted according to the polarization of the incident wave of the reception signals. This means that the exact polarization direction of the incident wave can be defined on the basis of the level of, for example, two reception signals that are cross-polar relative to one another. For the subsequent transmission case, the control unit can set the polarization direction of the emitted wave such that it corresponds exactly to the incident wave. When, for example, the level in the reception path with vertical polarization is twice as high as that with horizontal polarization, the control means correspondingly adjusts the transmission branches such that twice as much energy is beamed out in the transmission branch with vertical polarization as in the transmission branch with horizontal polarization.

According to another alternative development of the present invention, the radio station includes a means for determining quality criteria for the reception signals of the reception paths with different polarization and a means for selecting a reception path on the basis of quality criteria. It is therefore possible for the radio station to make statements about the polarization of the incident wave of the reception signals not only on the basis of the level but also on the basis of alternative evaluation criteria such as the signal-to-noise ratio or the bit error rate.

The control unit is thereby fashioned such that the transmission signals are connected to the antenna unit selected on the basis of the quality criteria or such that a hand-over of the transmission path to a transmission means is undertaken that corresponds with the antenna unit receiving a better reception signal according to the quality criteria. Either the connection from the transmission means to the antenna unit or the connection from a transmission means to the corresponding subscriber channel is then switched.

The selection of a transmission corresponds to a hand-over procedure as known in the GSM mobile radio telephone system given a change in frequency. The transmission signals of a transmission means are conducted to a permanently allocated antenna means. Quality measured values are determined over a measuring period and are compared to one another from the reception signals of various reception branches. According to the inventive method, a hand-over procedure occurs to the transmission branch corresponding with the better reception branch when the quality measured value of this reception branch lies above that of the reception branch corresponding to the previously selected transmission branch. The transmission means that is connected to the antenna unit, via which the polarization direction coming closest to the reception signal can be set, is thus regularly selected.

According to advantageous developments of this method, the quality measured values correspond to level measured values that are particularly easy to acquire from the reception signal. Advantageously, the hand-over procedure is only instituted when the difference between the level measured values lies above a prescribable limit (threshold) in order to avoid excessively frequent switching.

According to a further development of the inventive method, the hand-over procedure is only instituted when, on the basis of the level measured values, a hand-over procedure is requested at a plurality of successive points in time. A second hand-over which follows a first hand-over can be blocked for a prescribable time span. This measure also prevents a constant hand-over with high use of system resources given approximately identical reception paths.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
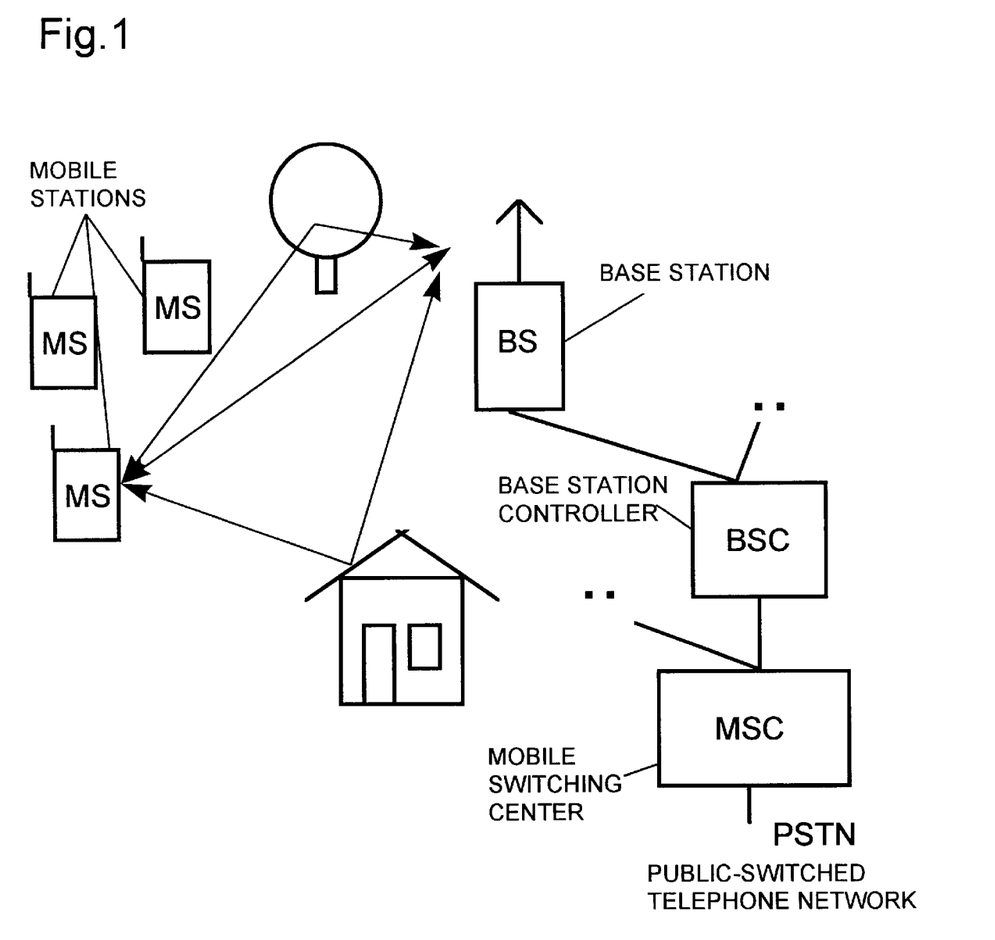
FIG. 1 shows a mobile communication system in block diagram form in accordance with the teachings of the present invention.

The mobile communication system shown in FIG. 1 is a known GSM mobile radio telephone system that is composed of a plurality of mobile switching centers MSC that are networked with one another or, respectively, are accessed to a public-switched telephone network PSTN. Further, these mobile switching centers MSC are respectively connected to at least one base station controller BSC. Each base station controller BSC, in turn, enables a connection to at least one base station BS such that it controls both the base station BS itself and the connection to this base station BS.

Such a base station BS is a radio station that can set up a communication connection to a mobile station via a radio interface. By way of example, FIG. 1 shows such a radio connection to a mobile station MS. The radio interface between base station BS and mobile station MS is organized according to the time-division multiplex method. However, it could also be organized according to the frequency-division multiplex method or according to a further method. For example, eight time slots may be offered on a carrier frequency which are capable of being utilized for various communication connections and for the organization of the radio interface.

The communication connection between a base station BS and a mobile station MS is subject to a multi-path propagation that, due to reflections and defractions at buildings or plantings, for example, is produced in addition to the direct propagation path. When one assumes movement on the part of the mobile station MS, then the influence of the reflections, defractions and additional disturbances is time-dependent.

When the message transmission from a mobile station MS to a base station BS occurs, the various signal components arrive time-variably at the receiving base station BS and are superimposed thereat. Extinction phenomena that deteriorate the communication connection can thereby arise. The superimposition of the various signal components also means that the polarization direction of the reception signals varies time-dependently.

The radio station described below, and exemplary base station BS, evaluates the polarization direction of the reception signals and acquires statements about the configuration of the polarization direction of the emitted transmission signals therefrom. Such transmission signals are to be transmitted in what is referred to as the down link from the base station BS to the mobile station MS.

Figure 2:
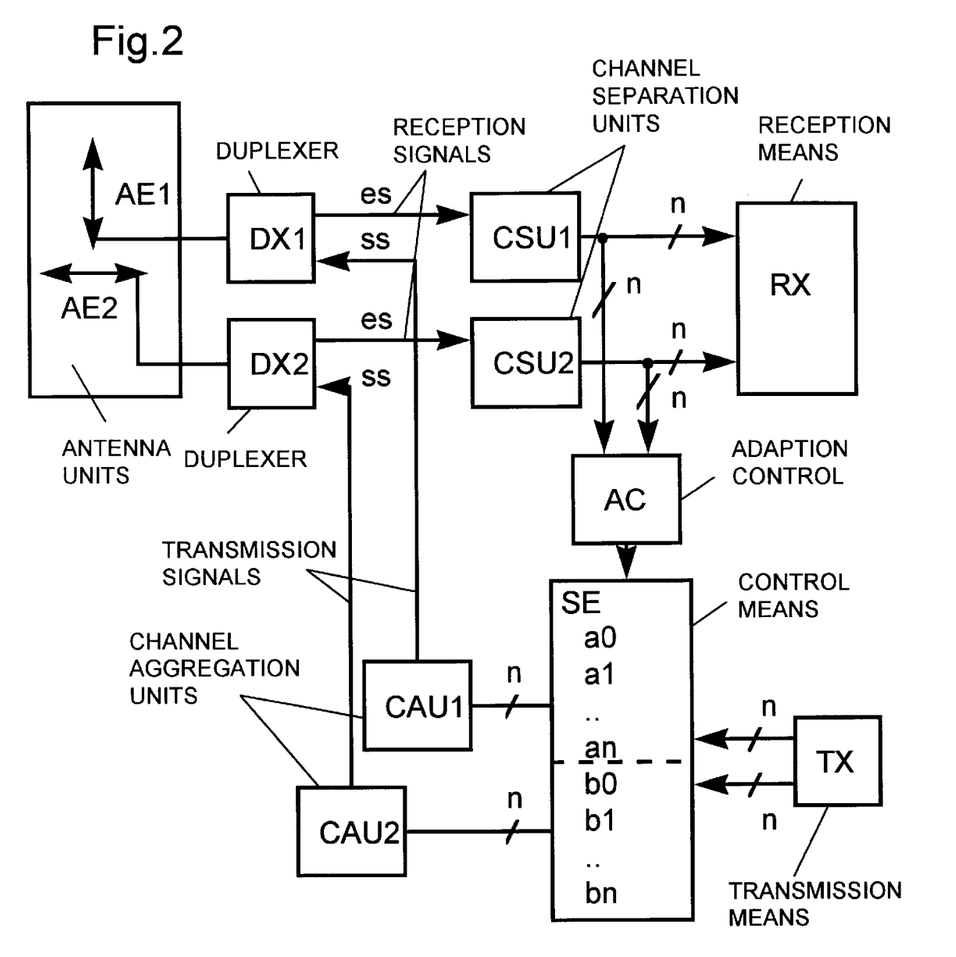
FIG. 2 shows a radio station in block diagram form with adaptive follow-up of the polarization direction of the transmission signals in accordance with the teachings of the present invention.
Figure 3:
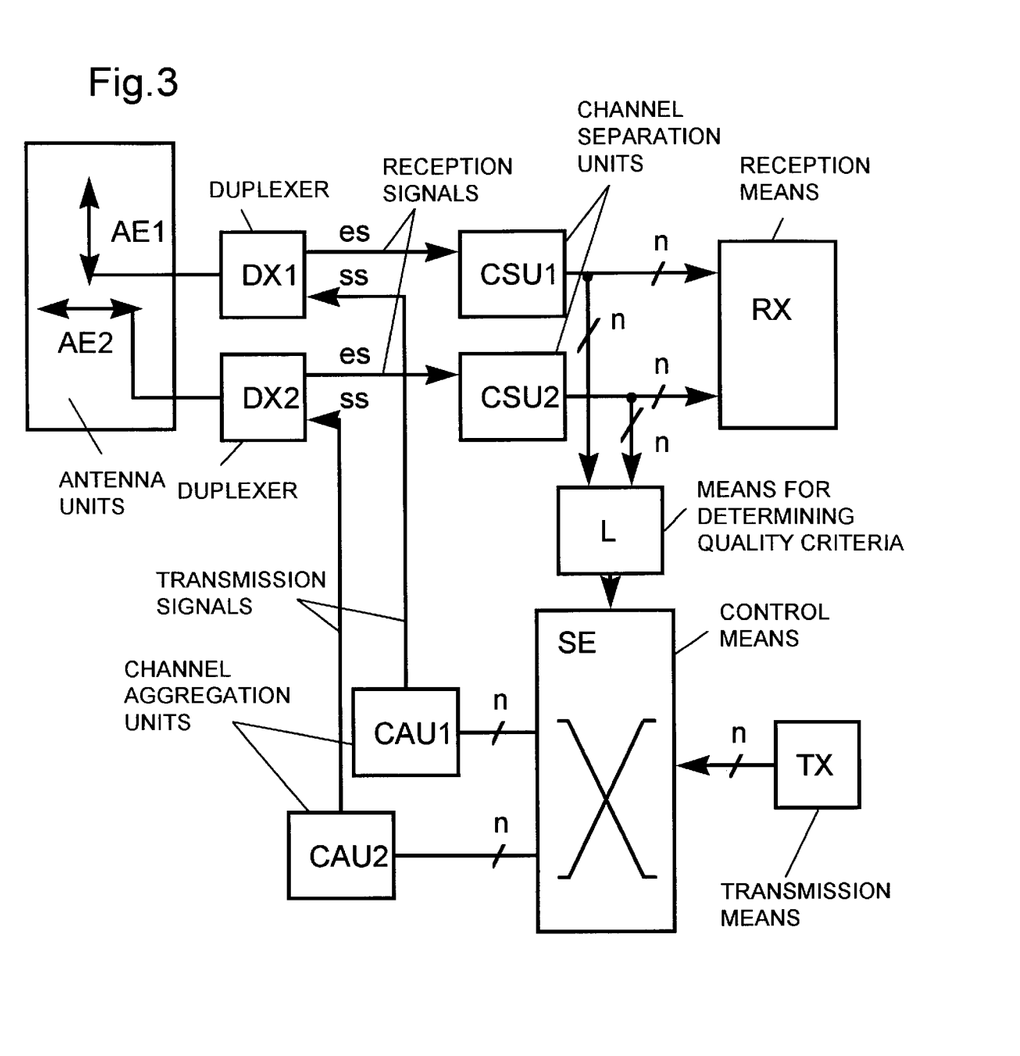
FIG. 3 shows a radio station in block diagram form with adaptive selection of an antenna unit according to the polarization direction of the reception signals in accordance with the teachings of the present invention.
Figure 4:
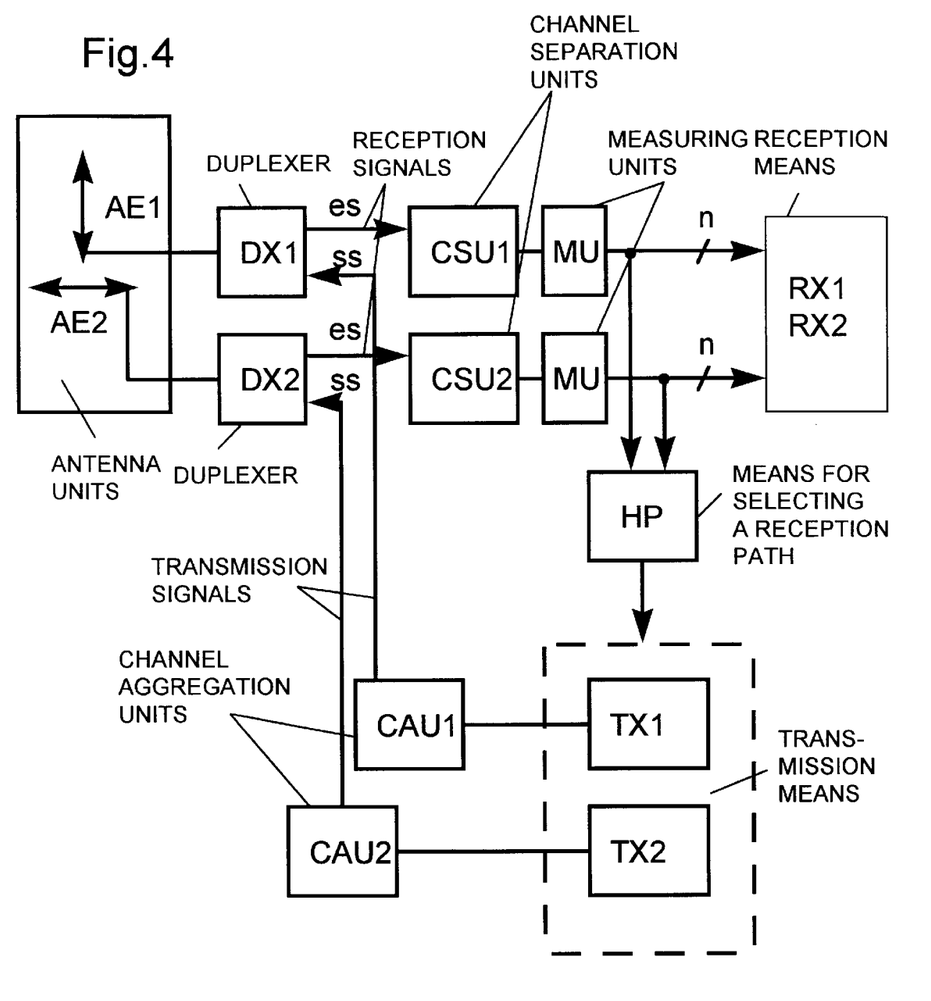
FIG. 4 shows a radio station in block diagram form with adaptive selection of a transmission means permanently connected to an antenna unit on the basis of a hand-over process in accordance with the teachings of the present invention.

The radio stations of FIGS. 2 through 4 represent alternative embodiments of the present invention which modify known base stations such as a GSM mobile radio telephone system. Only the assemblies that have functions in the invention for following-up the polarization direction of the transmission signals within the radio station are described below.

The radio station according to FIG. 2 has two antenna units AE1 and AE2 that are respectively near, and cross-polarized to, one another. The antenna units AE1 and AE2 are transmission and reception antennas that are also respectively connected to duplexers DX1 and DX2. These duplexers DX1 and DX2 implement a separation between transmission and reception paths.

The radio station contains one channel separation unit CSU1, CSU2 per reception branch and contains one channel aggregation unit CAU1, CAU2 per transmission branch. The channel separation units CSU1, CSU2 correspondingly accept the reception signals. For example, the first channel separation unit CSU1, which is connected to the copolarly polarized first antenna unit AE1, processes the copolarly polarized reception signals es. Correspondingly, the second channel separation unit CSU2 processes the cross-polarly polarized reception signals es.

The channels are separated in the channel separation units by subscriber relation. In the GSM mobile radio telephone system, the received signals first pass through a band-pass filter that is tuned to the GSM frequency band before a splitter divides the GSM reception spectrum into the individual narrow-band FDMA channels (FDMA=Frequency Division Multiple Access). According to the GSM specification, each FDMA channel is divided into eight TDMA channels (time slots) according to a TDMA (Time Division Multiple Access). Each subscriber channel is thus characterized by a carrier frequency and by a time slot and is separated by the channel separation unit CSU1 or, respectively, CSU2 and is supplied to a reception means RX.

After the channel separation, the levels of the signal received in the two reception branches are measured in a means for level measurement AC (Adaption Control). The polarization direction of the received wave can be identified on the basis of this information. It is calculated from a vectorial additional of the two orthogonal polarization directions weighted with the reception levels.

Transmission is then carried out with this polarization, to which end the transmission signals ss in two weighted paths are emitted via the dual-polarized antenna (antenna units AE1, AE2). The polarization direction of the emitted transmission signals ss can be represented by the weightings $a0 \ldots an$ and $b0 \ldots bn$ that are determined in a means AC for determining the polarization direction. To this end, the weightings $a0 \ldots an$ and $b0 \ldots bn$ are set by a control unit SE such that the vectorial addition of both transmission signals ss emitted by the antenna units AE1 and AE2 yields the desired polarization direction in transmission direction.

The control means SE is connected to the means for level measurement or, respectively, for determining the polarization direction AC, to the transmission means TX and to the channel aggregation units CAU1, CAU2. In the control unit SE, the transmission signals ss generated by the transmission means TX are weighted, as described, with small $a0 \ldots an$ or, respectively, $b0 \ldots bn$ and supplied to the channel aggregation units CAU1 and CAU2. The influencing of the transmission signals ss must occur via subscriber-relation since the setting of the polarization direction is individually undertaken for each subscriber, i.e. for each communication connection. In the channel aggregation units CAU1, CAU2, the time slots of the individual communication connections are subsequently connected to one another block-by-block and the complete frequency band of the transmission is generated given a plurality of carrier frequencies. The functioning of the channel separation units CSU1, CSU2 and of the channel aggregation units CAU1, CAU2 was explained here with reference to the GSM mobile radio telephone system. When, however, different transmission methods are employed at the radio interface, these units are fashioned according to the selected transmission method.

The evaluation of the reception signals as described in connection with FIG. 2 and the weighting of the transmission signal ss assumes that the two polarizations which reside cross-polarly relative to one another are linear. However, it is equally possible that the adaption of the polarization might occur with two oppositely directed, circular polarizations. In such a case, the adaption ensues with a different phase modulation of the two antenna units. Alternatively, further electronic methods can be utilized for setting the polarization direction.

The radio station as shown in FIG. 3 exhibits some modifications compared to the radio station in FIG. 2. In this particular embodiment of the present invention, a weighting of the transmission signal ss does not occur. Rather, a selection of a transmission branch assumes with the assistance of, for example, a switch matrix.

In the reception branch, a statement about the quality of the reception signals es with different polarization is acquired for the reception signals es with a means L for determining quality criteria. A quality criterion can thereby be defined on the basis of the bit error rate, of the signal level, of the signal-to-noise ratio or of the ratio of the carrier signal to the noise signal. It can also be defined on the basis of a combination of these characteristics.

The selection of a reception path occurs in the means L on the basis of the quality criteria. The selection determines which privileged polarization direction the reception signal es exhibits, i.e. which polarization direction should preferably be employed for the transmission case. For example, for a control unit SE that is fashioned as a switch matrix, the transmission signals ss on the transmission path generated in the transmission means TX are connected to the selected antenna unit AE1 or AE2. A plurality of antenna units can also be utilized.

Referring to the radio station in FIG. 4, the selection of a transmission path occurs in a way that is modified compared to the radio station of FIG. 3 since transmission means TX1 and TX2 are respectively permanently connected to a transmission path. A statement about the quality of the reception signal es of different polarization is acquired for each reception path with a measuring unit MU for determining quality criteria. Signal parameters suitable for a hand-over procedure, for example, the level or the quality of the reception signals es, are extracted in subscriber-related fashion for each reception branch in this measuring unit MU.

The radio station further comprises a means HP for selecting a reception path on the basis of the quality criteria. The means HP institutes a hand-over procedure according to which a transmission means TX1, TX2 is selected that is connected to the antenna unit AE1, AE2 that receives the better reception signal according to the quality criteria. The hand-over procedure is better explained with the assistance of the flow chart of FIG. 5.

Figure 5:
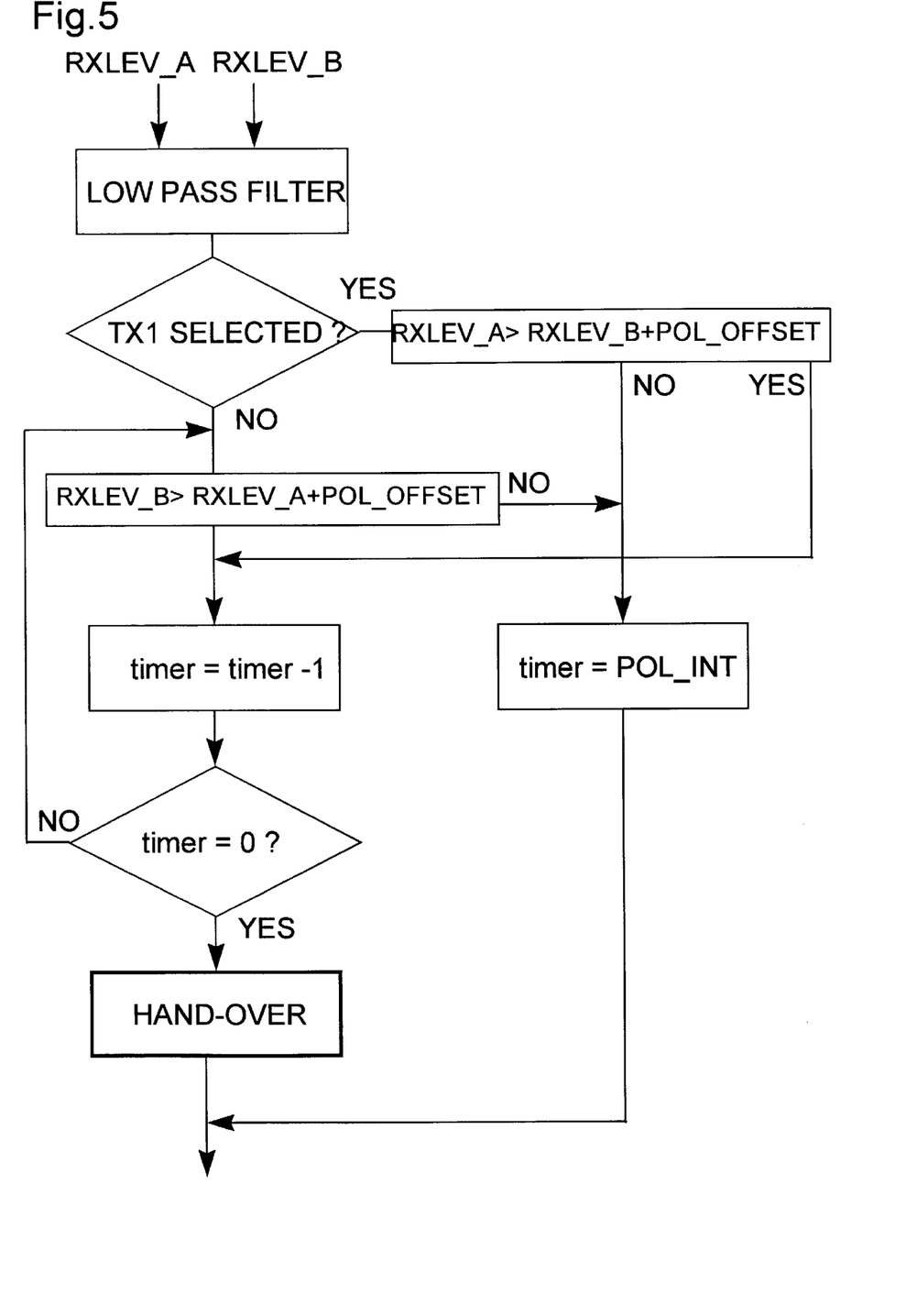
FIG. 5 shows a flow chart of the hand-over process of the radio station according to FIG. 4.

As suitable signal parameters for the quality criteria, measured values are RXLEV_A and RXLEV_B of the reception level in the corresponding reception branches with different polarization determined in the base station over a SACCH measuring period (480 ms) are generated in the measurement unit MU. These measured values RXLEV_A and RXLEV_B are first subjected to a suitable low-pass filtering before they are supplied to the hand-over decision process.

When it is assumed that the existing communication connection is covered via a transmission means TX1 and the comparison of the filtered measured values of the reception level RXLEV_A and RXLEV_B finds that the measured value RXLEV_B of the second reception path exceeds the measured value RXLEV_A of the first reception path by a limit value POL_OFFSET, then a timer with the starting value POL_INT is started in the hand-over decision process. The timer or, respectively, the time interval POL_INT to be monitored should be longer than or equal to a SACCH measurement period. In order to avoid unnecessary hand-overs, the time interval to be monitored, however, should amount to a number of seconds.

During the rundown of the timer or, respectively, during the arbitrary but fixed time interval POL_INT, a determination is made on the basis of the measured data RXLEV_A and RXLEV_B entering the hand-over decision process as to whether reception is still significantly better in the second reception path than in the first reception path. When it is found in the hand-over decision process that the second reception path is still significantly better than the first reception path after expiration of the timer or, respectively, after the time interval POL_INT, then a hand-over for the associated mobile station MS from the first transmission means TX2 to the second transmission means TX1 in the same base station BS is requested.

When, by contrast, it is found in the hand-over decision process that the second reception path is no longer significantly better than the first reception path after expiration of the timer, no hand-over is requested for the associated mobile station MS. When, before expiration of the timer, it is found on the basis of the measured data RXLEV_A and RXLEV_B that the second reception path is not significantly better than the first, the timer is reset. The timer is started when it is recognized in the hand-over decision process that the mobile station MS is again received significantly better in the second reception path than in the first reception path. The hand-over decision process is analogously handled when the mobile station MS is serviced by the second transmission means TX2.

For the purpose of suppressing random influences or, respectively, for stabilizing the hand-over decision process, a monitoring timer can be introduced individually for each communication connection between the resetting of the timer and the re-start of the timer in addition to the hand-over process shown in FIG. 5. This monitoring timer is started upon reset of the timer. The timer therefore can only be started after expiration of this monitoring timer and only if the start conditions are met.

The timer and monitoring timer can also be implemented as counters. Both are individually administered for each communication connection. The start values of the timers can be individually set for each transmission or, respectively, reception branch or can be occupied with identical values for all branches. The timers or the monitoring timers can be occupied with start values from a unit. For example, an operating and maintenance center which is remote from the base station.

Although the present invention has been discussed with reference to specific embodiments, those of skill in the art will recognize that changes may be made thereto without departing from the spirit and scope of the invention as set forth in the hereafter appended claims.

We claim as our invention:

1. A radio station for mobile communication systems, comprising:

at least two antenna units with different polarization, each of the at least two antenna units being connected to respective duplexers for the separation of transmission and reception branches;

at least two channel separation units, each of the at least two channel separation units being connected to one of the duplexers for each reception branch;

at least two channel aggregation units, each of the at least two channel aggregation units being connected to one of the duplexers for each transmission branch;

a control unit for the transmission-branch control of transmission signals onto the antenna units according to a weighting procedure which correlates the transmission signals with reception signals of the reception branches;

means for level measurement of the reception signals received by the antenna units; and means for determining the polarization direction of the reception signals from the level measurement, whereby the control unit operates to weight the transmission signals for the transmission branches according to the polarization of an incident wave of the reception signals.

2. A radio station as claimed in claim 1, further comprising:

transmission signals of the two antenna units which are cross-polarized relative to one another.

3. A radio station as claimed in claim 1, further comprising:

transmission signals of the two antenna units which are linearly cross-polarized relative to one another.

4. A radio station as claimed in claim 1, further comprising:

transmission signals of the two antenna units which are oppositely circular cross-polarized relative to one another.

5. A radio station as claimed in claim 1, further comprising:

means for determining quality criteria for the reception signals of the reception paths having different polarization of the antenna units; and means for selecting a reception path on the basis of the quality criteria whereby the control unit switches the transmission signals onto the selected antenna unit.

6. A radio station as claimed in claim 1, further comprising:

means for determining quality criteria for the reception signals of the reception paths having different polarization of the antenna units; and means for selecting a reception path on the basis of the quality criteria, whereby the control unit hands-over the transmission path to a transmission means connected to an antenna unit receiving better reception signal according to the quality criteria.

7. A radio station as claimed in claim 5, whereby the quality criterion is defined on the basis of a bit error rate.

8. A radio station as claimed in claim 5, whereby the quality criterion is defined on the basis of a signal level.

9. A radio station as claimed in claim 5, whereby the quality criterion is defined on the basis of a signal-to-noise ratio.

10. A radio station as claimed in claim 5, whereby the quality criterion is defined on the basis of the ratio of carrier signal-to-noise signal.

11. A method for selecting a transmission means in a radio station as claimed in claim 6, comprising the steps of:

supplying transmission signals of a transmission means to a permanently allocated antenna means;

determining quality measured values from reception signals of various reception branches over a measuring period;

comparing the quality measured values of the reception branches; and handing-over a transmission path to the transmission means corresponding to the better reception branch if the quality measured value of this reception branch lies above that of a reception branch corresponding to a previously selected transmission branch.

12. A method as claimed in claim 11, whereby the quality measured values are level measured values and the step of handing-over is instituted if a difference between the level measured values exceeds a prescribable limit value.

13. A method as claimed in claim 11, whereby the step of handing-over is instituted only given the repeated presence of a higher level measured value in the reception path not corresponding to the selected transmission path.

14. A method as claimed in claim 11, whereby a subsequent step of handing-over is inhibited for a prescribable time span.

* * * * *